July 20, 1948.  M. E. FLOEGEL  2,445,519
DEVICE FOR EXERCISING OCULAR MUSCLES
Filed Jan. 30, 1947
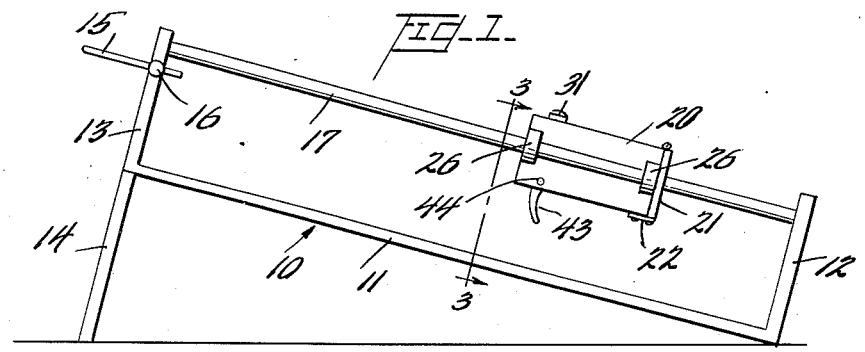
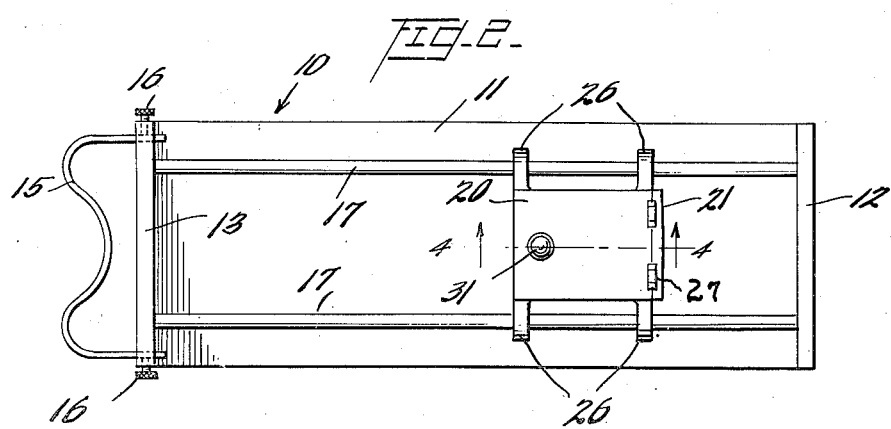
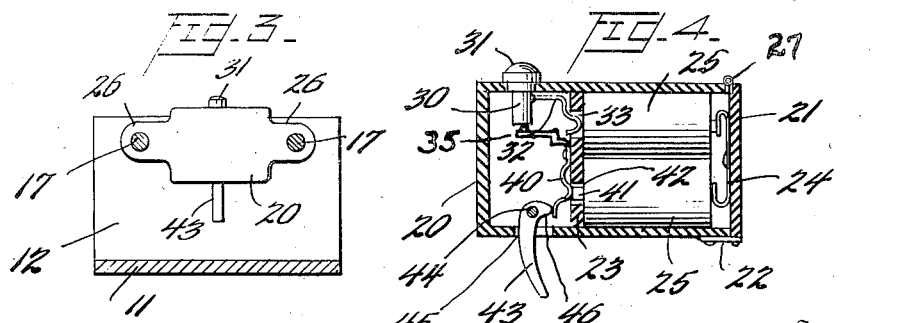
Inventor
Merle E. Floegel,
By J. R. Paris
Attorney Patented July 20, 1948

2,445,519

UNITED STATES PATENT OFFICE 2,445,519

DEVICE FOR EXERCISING OCULAR MUSCLES

Merle E. Floegel, Takoma Park, Md.

Application January 30, 1947, Serial No. 725,317

5 Claims. (Cl. 128—76.5)

This invention relates in general to eye muscle exercising apparatus and more specifically to that type of eye muscle exerciser wherein an object is moved between two fixed points, one close to the eyes the other relatively distant therefrom.

One object of this invention is to provide an effective device whereby an operator may exercise his ocular muscles by causing the lines of vision of his eyes to converge gradually at sharper and sharper angles as he focuses his vision upon an approaching object, causing his eye muscles to relax as the object is retracted from a given position in close proximity to the eyes to another given position relatively distant therefrom, and repeating these operations for a period of time.

Another object of this invention is to provide a device for the purpose mentioned above wherein the object, upon which the eyes are focused, is a light bulb, or any other suitable luminous object, which is illuminated during the approaching movement but extinguished or darkened during the retracting movement thus facilitating the desired relaxation of the ocular muscles during the latter movement, this effect being particularly marked when the exercise is performed in a darkened room.

The eye muscle exerciser of the present invention consists of a frame of wood, metal, or other suitable structural material, upon which a housing for mounting a luminous object, such as a light bulb, or a luminescent object, and for containing a switch and a battery for operating said bulb, or other suitable devices for darkening the object, is slidably mounted along rails supported by said frame. An adjustable chin rest may be attached and so positioned that when the operator places his chin upon said rest his line of vision will be directed substantially along the line of travel of the fixation object.

The handle whereby the operator slidably moves said housing also operates a switch or other devices for controlling the illumination or extinguishment of the fixation object. Thus, when moving said housing toward himself by pulling on the handle, the operator closes a switch in the housing, completing a circuit between a source of current, such as a battery which may be contained in the housing, and the light bulb, causing it to be illuminated; while the operation of pushing on the handle to move the housing away from the operator opens the switch breaking said circuit and causing the light bulb to be extinguished.

Therefore, in its operation, after adjusting the chin rest as desired, the operator places his chin upon said rest thus directing his line of vision generally in the direction of the line of movement of the fixation object. While the housing is moving toward the operator, the fixation object will be illuminated facilitating the continuous focusing of the eyes upon said object; while during the retracting movement of the housing the light will be extinguished, facilitating a complete relaxation of the eyes during this movement since their attention will not be attracted to the moving object. This effect is particularly noted when the exercise is performed in a darkened room. By repetition of this cycle over a period of time, the desired eye muscle exercise is obtained.

A more detailed description of this eye muscle exercising device is given below in conjunction with the accompanying drawings, wherein Fig. 1 is a side view of the apparatus, Fig. 2 is a top view of the apparatus, Fig. 3 is a cross sectional view of the device taken along line 3—3 of Fig. 1, and Fig. 4 is a cross sectional view of the fixation object housing taken along the line 4—4 of Fig. 2.

The frame 10 consists of the base 11, the head board 13, the foot board 12, and the leg 14. These are arranged as illustrated in Figure 1 so that when the device is placed for use upon a table top, or any other suitable surface, it will rest in a tilted position, the head board being elevated by the leg 14. The purpose of this arrangement is to enhance the comfort of the operator when using this device.

Adjustably mounted upon the head board through suitable openings therein is the chin rest 15. Said rest is held in an adjusted position by the two set screws 16.

The two rails 17, preferably circular in cross section and constructed of glass rod, metal rod, or other suitable material, are mounted upon the head board 13 and foot board 12 and contained therebetween. These rails afford the structure upon which the slidable movement of the fixation object housing is obtained in its above described approaching and withdrawing movements.

The fixation object housing 20 is essentially a small box, of suitable structural material as wood, a composition fiber board, or a plastic material. Mounted on the top of this box is a receptacle 30 designed to receive light bulb 31, preferably red or yellow in color, said bulb being the fixation object of this device. Enclosed within housing 20 are the two dry cells 25 which are connected in series to bulb 31 and constitute the battery whereby said bulb may be illuminated. The lighting circuit is composed of the two cells 25, the conducting element 24 connecting the two cells in series, the conducting element 32 connecting the battery to one contact of socket 30, and the conducting element 35 which in conjunction with conducting element 40 completes the circuit from the other contact of socket 30 back to the battery. The conducting elements 24 and 32 are resilient to insure suitable contact with the dry cells. Element 40 is likewise a spring and serves as an integral part of a switch for opening and closing the illuminating circuit.

The switch consists of two parts, the spring element 40 and the handle 43. Handle 43 is pivotally mounted on rod 44. A portion of handle 43 protrudes from the bottom of the housing through opening 45. When pressure is exerted upon the protruding portion of handle 43 so as to draw the housing toward the head board and chin rest and operator when in the normal position for using the device, the pivoting of handle 43 on rod 44 will bring lobe 46 to bear against element 40 forcing it into contact with electrode 41 of the battery, thus completing the circuit and causing the bulb 31 to be illuminated, as illustrated in Figure 4. However, when pressure is applied to handle 43 in the opposite direction so as to cause housing 20 to move away from the head board 13 toward the foot board 12, lobe 46 will be pivoted out of contact with element 40 enabling it to break contact with electrode 41 in response to its spring tension, extinguishing the light bulb. Further, in its inoperative state, when no manual pressure whatsoever is applied to handle 43, the spring action of element 40 is sufficient to insure an open circuit between it and electrode 41, thus preventing any unnecessary discharging of the battery.

Additional structural features are incorporated in the housing 20 in the form of a door 21, projections 26, and partition 23. The back side of the housing constitutes a door 21 pivoted on hinges 27 and secured in a closed position by a conventional latch 22; the purpose of said door being to facilitate the replacing of dry cells 25. The four projections 26, two extending from each side of the housing, contain circular openings of sufficient size to permit slidable movement over rails 17. In the construction of this apparatus, the housing 20 is mounted on rails 17 by means of said openings in projections 26 so as to permit slidable movement of the housing along these rails. Partition 23 extends transversely across the housing 20 so as to form a compartment in which the cells 25 will be securely held in position. The partition is also supplied with suitable openings 33 and 42 to permit the necessary contacts with the battery electrodes.

In the use of this eye exercising device the housing 20 with its light bulb 31 will be manually moved along the rails 17 to and fro between the foot board 12 and the head board 13 by exerting the required force upon the handle 43. The operator, with his chin placed on the chin rest 15 focuses his eyes upon the fixation object, the light bulb 31, as he slides the housing toward himself. During this movement the pressure on handle 43 closes the battery circuit as described above causing the bulb 31 to be illuminated. He maintains his eyes focused on said lighted bulb during this operation until he can no longer keep a proper focus. At this time, the operator reverses the movement of the housing so as to cause it to move away from him. The consequent reversal of manual pressure upon handle 43 immediately causes the battery circuit to be broken as described above with the resultant extinguishment of the bulb 31. This sudden extinguishment of the fixation object at the inception of and during the withdrawal movement of the housing facilitates an immediate relaxation of the eye muscles, since the involuntary reaction to keep the eyes focused on the fixation object during its withdrawal movement is minimized by the extinguishing of its illumination. This effect can be most markedly attained when the device is employed in a darkened room.

Another modification lies in the fact that this device may be used, in addition to performing the exercise described above, to perform an exercise wherein the operator sits to the side of the apparatus and, holding his head still, follows with his eyes a transverse movement of the lighted fixation object, extinguished in its return movement, first exercising the eye muscle in one direction, then changing to the other side of this apparatus to exercise his eye muscles in the other direction.

As shown the luminous fixation object 31 is darkened or extinguished by the opening of the electric circuit. It will be understood that if desired, darkening or extinguishing the fixation object may be done by a shutter. The luminous fixation object instead of being an electric bulb may, if desired, take the form of a spot of radium or other self-luminous paint on a slider movable in the guideway, the same being provided with a shutter operable to expose the spot when moving in one direction and to darken or extinguish it when moving in the opposite direction.

What is claimed is:

1. A device for the exercising of ocular muscles comprising a frame, a fixation object housing slidably mounted thereon, a fixation object mounted upon said housing, an electric circuit for electrically illuminating the fixation object, a spring switch in said circuit for controlling said illumination, and a handle pivotally attached to said housing for facilitating the moving of said housing slidably along the frame in two directions and for simultaneously operating said switch, wherein the fixation object will be illuminated in one direction of travel but extinguished in the other.

2. A device for the exercising of ocular muscles comprising a frame, a fixation object housing slidably mounted thereon, a fixation object mounted upon said housing, an electric circuit enclosed within said housing for electrically illuminating the fixation object, a spring switch in said circuit for controlling said illumination, and a handle for manually moving said housing slidably in two directions along the frame and for simultaneously operating said switch, wherein the fixation object will be illuminated in one direction of travel but extinguished in the other.

3. A device for exercising ocular muscles, comprising a travel guide, a luminous fixation object mounted on said travel guide, said fixation object being movable along said guide in either of two directions, movement in one direction being an eye exercising stroke and movement in the opposite direction being an eye relaxing stroke, an illumination controlling means for said object, and a lever for moving the object on the guide, said lever also serving to operate the illumination controlling means to render said object luminous during said eye exercising stroke and darkening said object during the eye relaxing stroke.

4. A device for exercising ocular muscles, comprising a travel guide, a fixation object housing, a luminous fixation object mounted on said housing, said housing being movable along said guide in either of two directions, movement in one direction being an eye exercising stroke and movement in the opposite direction being an eye relaxing stroke, an illumination controlling means, and a lever for moving the housing and fixation object in the two directions, said lever occupying one position in said housing when the movement is in one direction and occupying another position when the movement is in the opposite direction, said lever serving to operate the illumination controlling means rendering said fixation object luminous during the eye exercising stroke and darkened during the eye relaxing stroke.

5. A device for exercising ocular muscles, comprising a frame, a travel guide disposed between the ends of said frame, a fixation object housing, a luminous fixation object mounted on said housing, said housing being movable along said guide in either of two directions, movement in one direction being an eye exercising stroke and movement in the opposite direction being an eye relaxing stroke, an illumination controlling means, and a lever for moving the housing and fixation object in the two directions, said lever being mounted in said housing to pivot between two positions, occupying one position during one direction of movement and the other position during the other direction of movement, said lever serving to operate the illumination controlling means rendering said fixation object luminous during the eye exercising stroke and darkened during the eye relaxing stroke.

MERLE E. FLOEGEL.

REFERENCES CITED

The following references are of record in the file of this patent:

UNITED STATES PATENTS

| Number | Name | Date |
|---|---|---|
| 2,166,063 | Krimsky | July 11, 1939 |
| 2,203,069 | Woelfel | June 4, 1940 |
| 2,422,384 | Alexander | June 17, 1947 |